(12) United States Patent
Carvalho et al.

(10) Patent No.: US 10,464,660 B2
(45) Date of Patent: Nov. 5, 2019

(54) BLADE PLUG FOR COMMUNICATING FLUID THERETHROUGH

(71) Applicants: Hamilton Sundstrand Corporation, Windsor Locks, CT (US); Ratier-Figeac SAS, Figeac (FR)

(72) Inventors: Paul A. Carvalho, Hadley, MA (US); Stephane Grimal, Figeac (FR); Pierre Alexandre Picard, Figeac (FR)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 639 days.

(21) Appl. No.: 15/131,621

(22) Filed: Apr. 18, 2016

(65) Prior Publication Data

US 2016/0318598 A1 Nov. 3, 2016

(30) Foreign Application Priority Data

Apr. 28, 2015 (EP) .................................... 15305650

(51) Int. Cl.
*B64C 11/24* (2006.01)
*F01D 5/18* (2006.01)
*F04D 29/32* (2006.01)
*F04D 27/02* (2006.01)

(52) U.S. Cl.
CPC .............. *B64C 11/24* (2013.01); *F01D 5/18* (2013.01); *F04D 27/0292* (2013.01); *F04D 29/324* (2013.01); *F05D 2230/50* (2013.01); *Y02T 50/671* (2013.01); *Y02T 50/673* (2013.01); *Y02T 50/676* (2013.01)

(58) Field of Classification Search
CPC . B64C 11/24; F04D 29/3324; F04D 27/0292; F04D 29/324
See application file for complete search history.

(56) References Cited

U.S. PATENT DOCUMENTS 2,405,022 A 7/1946 Enos
3,667,862 A * 6/1972 Parr ...................... B64C 27/007
244/119

FOREIGN PATENT DOCUMENTS

CH 235185 A 11/1944
DE 10341058 B3 11/2004
EP 0171492 B1 8/1988

OTHER PUBLICATIONS

International Search Report, International Application No. 15305650.2-1754, dated Nov. 4, 2015, European Patent office; International Search Report 7 pages.

* cited by examiner

*Primary Examiner* — Igor Kershteyn
*Assistant Examiner* — John S Hunter, Jr.
(74) *Attorney, Agent, or Firm* — Cantor Colburn LLP (57) ABSTRACT

A method of manufacturing an aircraft blade is provided. The method includes attaching a fluid communicator to a plug tool connected to a blade plug, opening a passage in the blade plug using the plug tool, communicating fluid to or from a blade cavity through the passage using the fluid communicator, and sealing the passage in the blade plug using the plug tool.

10 Claims, 5 Drawing Sheets

FIG. 4

BLADE PLUG FOR COMMUNICATING FLUID THERETHROUGH

CROSS REFERENCE TO RELATED APPLICATION

This application is a continuation in part of European Serial No. 15305650.2 filed Apr. 28, 2015, the contents of which are incorporated by reference herein in their entirety.

BACKGROUND

Embodiments of the disclosure are directed to methods and devices for communicating fluid into or out of a blade cavity.

Blades, including aircraft blades, propeller blades, rotor blades, turbine blades, etc., may include an internal cavity that is plugged to prevent hub oil from migrating into the blade during operation. The plug may be installed during manufacture of the blade and, thus, ambient pressure may be locked within the cavity when the blade plug is installed. During manufacturing, ambient air pressure trapped within the blade cavity may be ambient air pressure at ground level. Then, during operation of the blade, i.e., during flight, a differential pressure may exist between the air locked within the blade cavity and the ambient air at altitude. Specifically, the ambient air at altitude may be significantly lower than the air pressure locked or trapped within the blade cavity. This differential pressure may result in stresses imposed on the blade that are added to the normal operating stresses that result from aerodynamic loading on the blade.

BRIEF DESCRIPTION

According to one embodiment a method of manufacturing an aircraft blade is provided. The method includes attaching a fluid communicator to a plug tool connected to a blade plug, opening a passage in the blade plug using the plug tool, communicator fluid to or from a blade cavity through the passage using the fluid communicator, and sealing the passage in the blade plug using the plug tool.

In addition to one or more of the features described above, or as an alternative, further embodiments may include installing the plug tool on the blade plug.

In addition to one or more of the features described above, or as an alternative, further embodiments may include evacuating air from the plug tool prior to operating the fluid communicator as a vacuum to evacuate air from within a blade.

In addition to one or more of the features described above, or as an alternative, further embodiments may include wherein the opening of the passage in the blade plug comprises moving a plug cap from a first position to a second position.

In addition to one or more of the features described above, or as an alternative, further embodiments may include wherein the sealing of the passage in the blade plug comprises moving the plug cap from the second position to the first position.

In addition to one or more of the features described above, or as an alternative, further embodiments may include installing the blade plug in an opening of a blade.

In addition to one or more of the features described above, or as an alternative, further embodiments may include checking a pressure within the blade when the passage is open.

According to another embodiment, a blade plug for an aircraft blade is provided. The blade plug includes a first body having a boss extending therefrom and an aperture passing through the boss, the first body configured to sealingly engage with an opening of a blade, a plug cap configured to releasably engage with the boss and move between a first position and a second position, and a passage passing through the first body configured to allow fluid communication through the first body. When the plug cap is in the first position, fluid may not pass through the passage and, when the plug cap is in the second position, fluid may pass through the passage.

In addition to one or more of the features described above, or as an alternative, further embodiments may include a second body configured to releasably attach to the first body and form a plug recess between at least a part of the first body and at least a part of the second body.

In addition to one or more of the features described above, or as an alternative, further embodiments may include at least one fastener configured to releasably attach the second body to the first body.

In addition to one or more of the features described above, or as an alternative, further embodiments may include a retainer ring configured to engage with the plug recess and configured to provide sealing engagement between the blade plug and a blade.

According to another embodiment, a plug system for an aircraft blade is provided. The system includes a blade plug having a first body having a boss, an aperture passing through the boss, and a passage passing through the first body configured to allow fluid communication through the first body, a plug cap configured to releasably engage with the boss and move between a first position and a second position, wherein, when the plug cap is in the first position, fluid may not pass through the passage and, when the plug cap is in the second position, fluid may pass through the passage, and a plug tool. The plug tool includes a tool body having a port, the tool body configured to sealingly engage with the boss of the blade plug and an operating portion configured to engage with the plug cap to move the plug cap between the first and second positions.

In addition to one or more of the features described above, or as an alternative, further embodiments of the blade plug may include a second body configured to releasably attach to the first body and form a plug recess between at least a part of the first body and at least a part of the second body, wherein the first body and the second body are configured to sealing engage with an opening of a blade.

In addition to one or more of the features described above, or as an alternative, further embodiments may include a fluid communicator connectable to the port of the plug tool to communicate fluid through the passage of the blade plug.

In addition to one or more of the features described above, or as an alternative, further embodiments may include that the blade plug and the plug tool form an integral body.

Technical effects of embodiments of the disclosure include a blade plug that is configured to enable fluid communication to or from a blade cavity, resulting in the minimization or elimination of differential pressure stresses experienced by the blade during operation and/or at altitude. Further, technical effects include a process for communicating fluid into or from the blade cavity during manufacture of the blade. Further technical effects include forming a vacuum in the blade cavity during manufacture of the blade.

BRIEF DESCRIPTION OF THE DRAWINGS

The subject matter which is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1A:
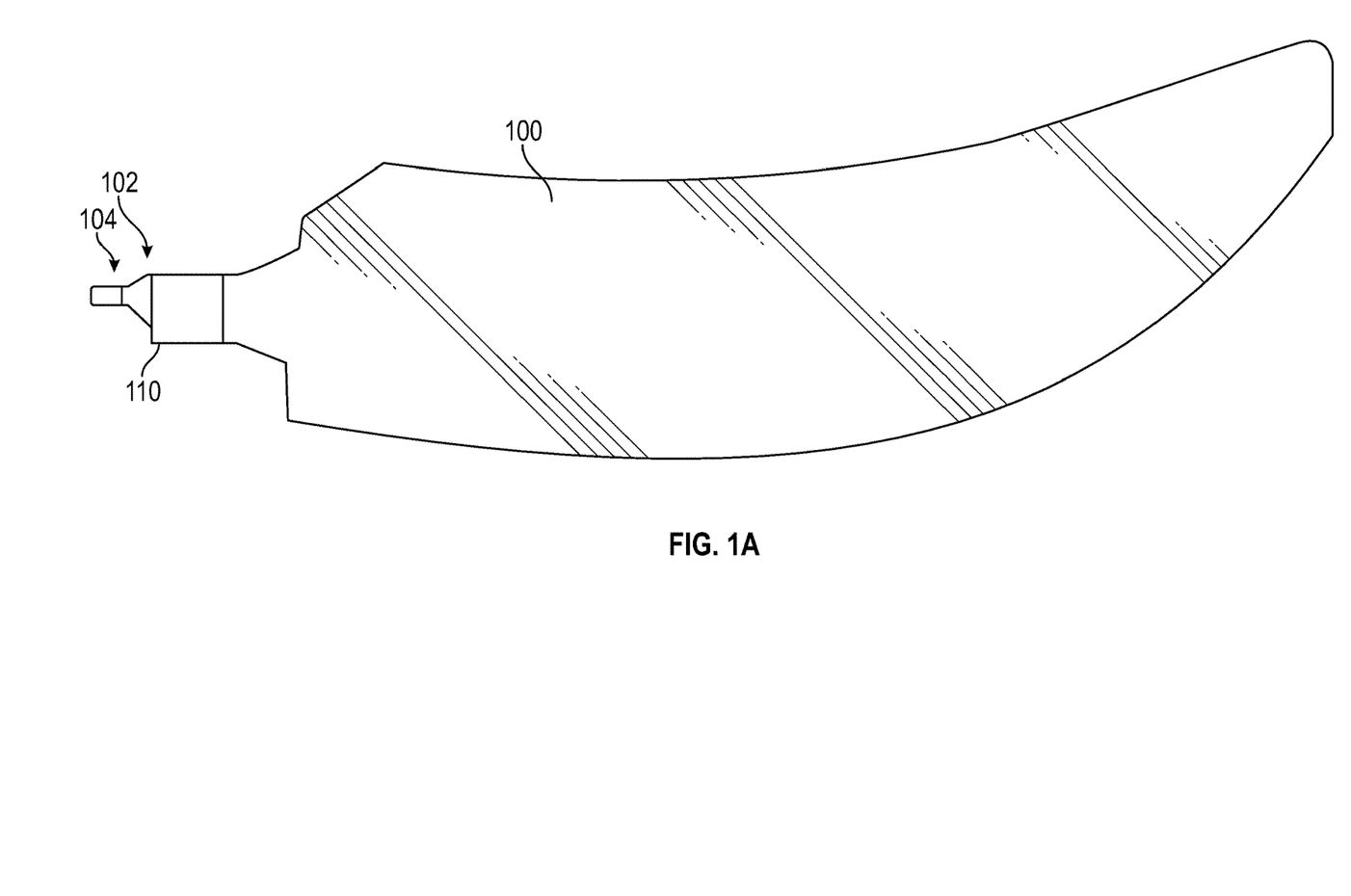
FIG. 1A is a schematic of a blade configured to include a blade plug.
Figure 1B:
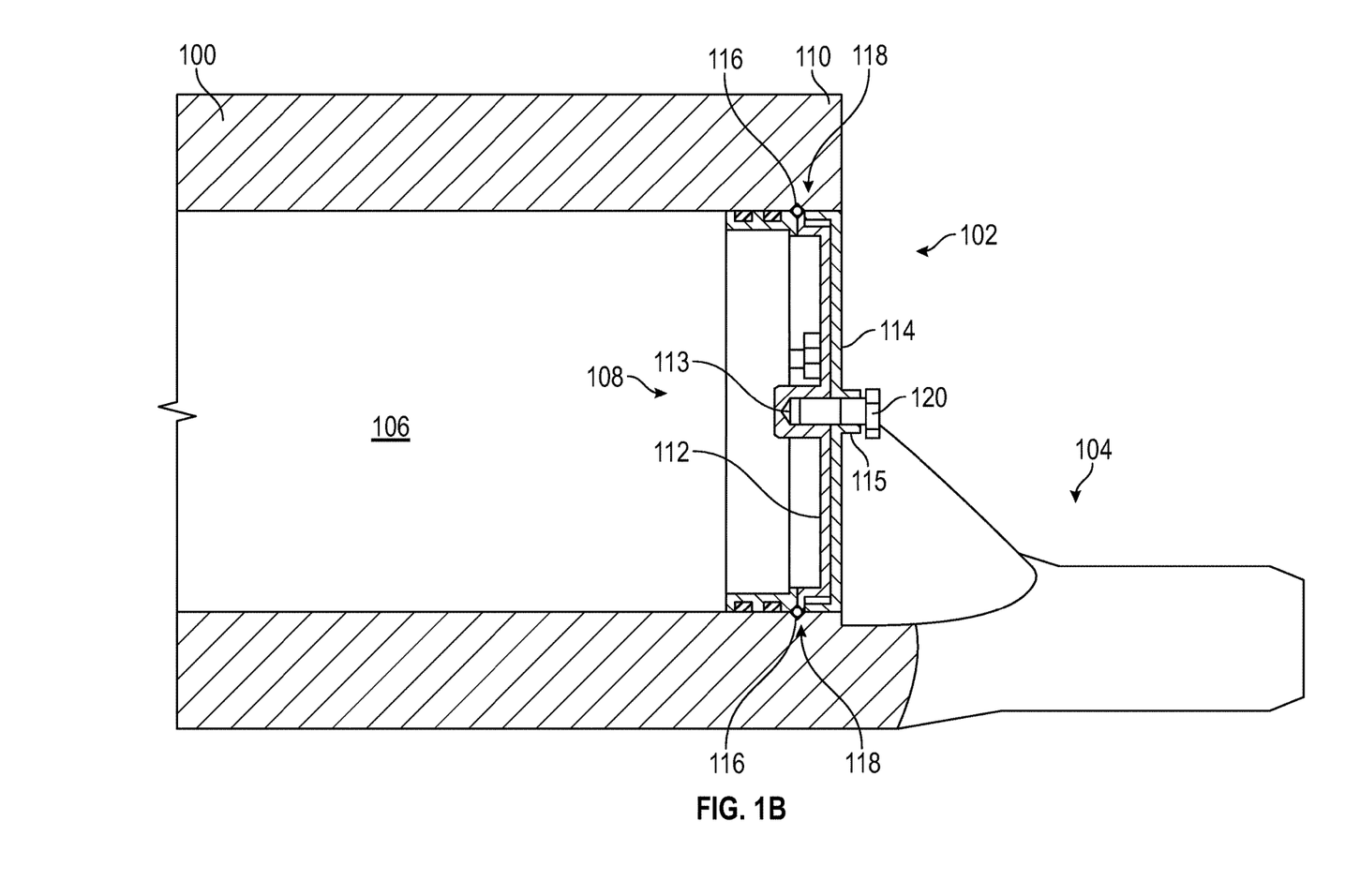
FIG. 1B is a close-up, cut-away view of the blade and blade plug of FIG. 1A.

FIGS. 1A and 1B illustrate a blade 100 with a blade plug 102 installed therein. The blade 100 may be a propeller or other blade used for operating an aircraft. For example, blade 100 may be a propeller blade for a prop plane. FIG. 1B shows a detailed view of an end 110 of the blade 100 where the blade 100 is configured to join with a propeller hub, pitch change actuator, or other driving mechanism of an aircraft. Thus, blade 100 includes a joining member 104 configured to engage with a driving mechanism, such as a propeller hub, pitch change actuator, or other driving mechanism. As shown, the blade 100 forms a hollow blade in order to reduce the weight of the blade 100 on an aircraft. Thus, blade 100 defines a blade cavity 106 therein.

The blade 100 includes an opening 108 at an end 110 proximal to the joining member 104. The opening 108 is sealed by the blade plug 102 to lock or seal the blade cavity 106. The blade plug 102 is configured to prevent oil, air, contaminants, and/or other fluids from entering the blade cavity 106. Thus, the blade plug 102 is configured to sealingly engage with the blade 100 in the opening 108 at end 110.

The blade plug 102 includes a first body 112 and a second body 114, the first body 112 configured to sealingly engage with the opening 108 of the blade 100. As shown, the first body 112 may be an inner body relative to the cavity 106 and the second body 114 may be an outer body relative to the cavity 106. The blade plug 102 defines a circular shape with an outer circumference that engages with the blade 100 at the opening 108. Thus, the first and second bodies 112, 114 may be formed as circular bodies that are solid and configured to seal the opening 108. A first aperture 113 may be located in the center of the first body 112, and a second aperture 115 may be located in the center of the second body 114. The first and second apertures 113, 115 may be aligned when the first and second bodies are installed within the opening 108 of the blade 100. Although apertures 113, 115 are shown in the center of the first and second bodies 112, 114, those of skill in the art will appreciate that the aperture(s) may be located at other locations.

The blade plug 102 further includes a retaining ring 116 configured to fit between an outer circumference of the first body 112 and an outer circumference of the second body 114, wherein the outer circumferences define a plug recess formed therebetween. The retaining ring 116 is also configured to engage with a blade recess 118 of the end 110 of the blade 100.

To install the blade plug 102 into the opening 108 of the blade 100, the first body 112 is inserted into the opening 108. Then, the retaining ring 116 is inserted into the opening 108 and fit within the recess 118. Next, the second body 114 is inserted into the opening 108, with the first aperture 113 and the second aperture 115 aligned. The first body 112 and the second body 114 are then releasably engaged and secured to each other by means of a fastener 120 that passes through the first and second apertures 113, 115. The fastener 120 is configured to tighten and hold the first body 112 in engagement with the second body 114 with the retaining ring 116 fitted therebetween. Thus, once the fastener 120 is engaged through the first and second apertures 113, 115, the blade plug 102 cannot be moved inward or outward relative to the opening 108 and thus the blade plug forms a seal at the opening 108.

The above described installation of the blade plug 102 is performed during manufacture of the blade 100. Thus, upon completion, the cavity 106 of the blade 100 may be filled with the ambient air that is present during manufacture, i.e., approximately ground level air pressure. As noted above, the pressure differential that may result between the sealed-in air of the cavity 106 and the ambient air during operation may result in increased stresses imposed on the blade 100.

Figure 2:
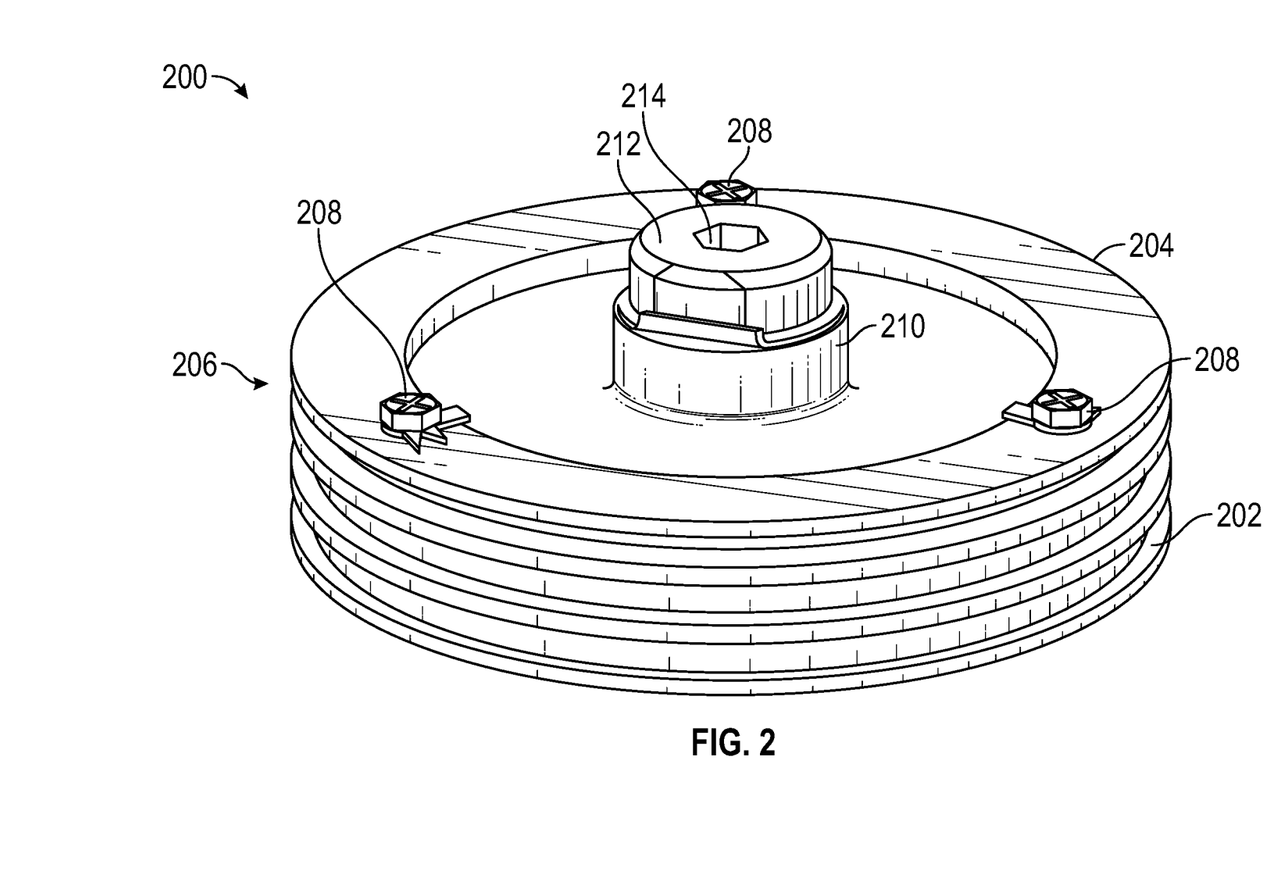
FIG. 2 is a perspective view of a blade plug in accordance with an exemplary embodiment of the disclosure.

Turning now to FIG. 2, a blade plug 200 in accordance with an exemplary embodiment of the disclosure is shown. Blade plug 200 includes a first body 202 and a second body 204. As shown, the first body 202 forms a solid surface whereas the second body 204 forms a ring. This is merely an exemplary and illustrative embodiment, and other configurations are possible without departing from the scope of the disclosure.

A plug recess 206 is formed between an outer circumference of the first body 202 and an out circumference of the second body 204. The first body 202 and the second body 204 are configured to sealingly engage and/or fit within an opening of a blade, e.g., as shown in FIG. 1, with a retaining ring (not shown) engaged and held between the first body 202 and the second body 204 in the plug recess 206, as described above.

The second body 204 is retained or engaged with the first body 202 by a number of fasteners 208. As shown, three fasteners 208 are used; however, those of skill in the art will appreciate that any number of fasteners may be employed without departing from the scope of the disclosure. Further, although shown as screws or bolts, other types of fasteners, including mechanical and/or chemical bonds may be used without departing from the scope of the disclosure.

The first body 202 includes a plug boss 210 extending from the solid surface thereof. When installed on a blade the plug boss 210 is configured to extend away from a blade cavity. A plug cap 212 is configured to sealingly engage with the plug boss 210. The plug cap 212 removably and releasably engages with the plug boss 210 to provide a seal therebetween. The plug cap 212 includes an engagement mechanism 214. As shown, the engagement mechanism 214 is a hex-shaped recess in a top of the plug cap 212 and is configured to allow a tool to engage with the plug cap 212 for release or removal of the plug cap 212 from the plug boss 210, and for installation into the plug boss 210. Advantageously, as explained below, the plug cap 212 allows for fluid communication through the blade plug 200 to the blade cavity, when the blade plug 200 is installed and sealingly secured within an opening of a blade. For example, such access enables generation of a vacuum within the blade cavity, thus reducing the internal stresses that may result from pressure differentials when ambient air is locked or trapped within the blade cavity. Alternatively, such access enables fluid to be communicated into the blade cavity to increase the pressure.

Figure 3:
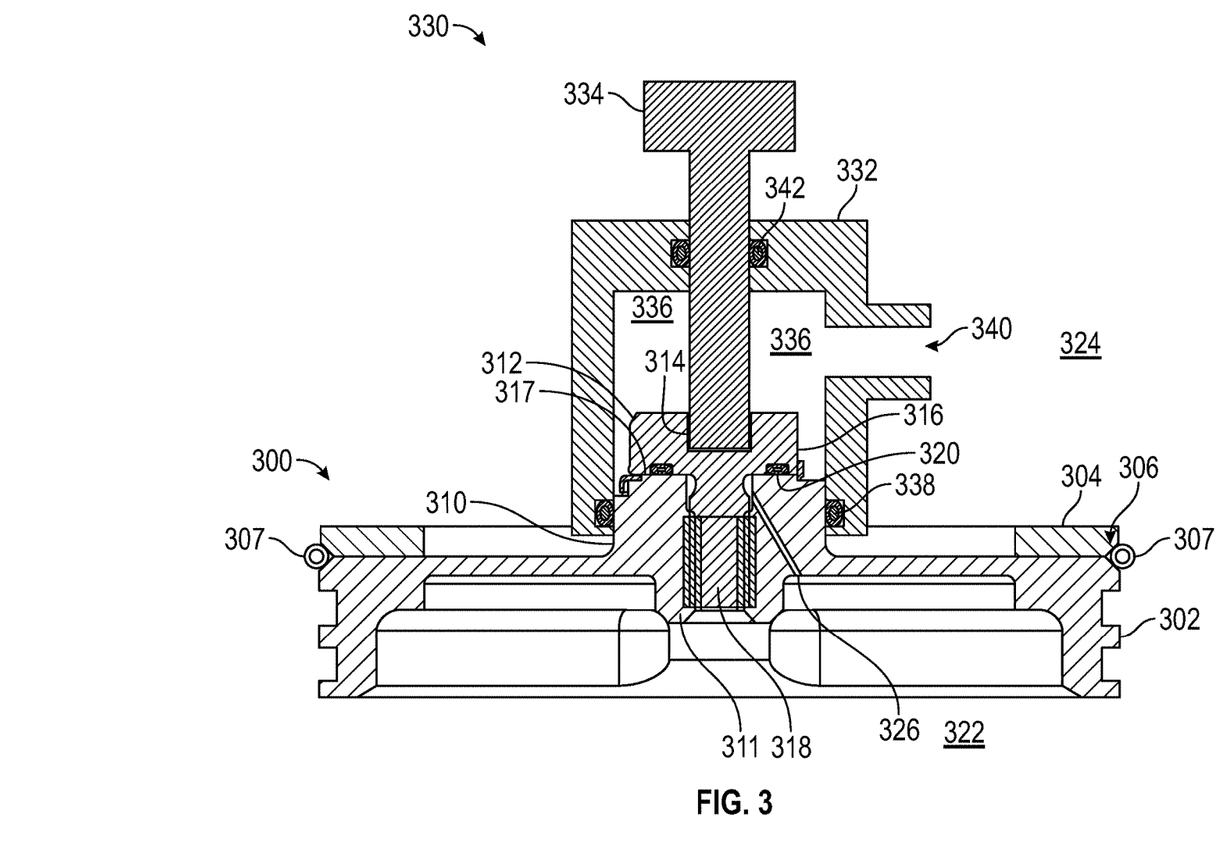
FIG. 3 is a side cross-sectional view of a blade plug and plug tool in accordance with an exemplary embodiment of the disclosure.

Turning now to FIG. 3, a cross-sectional side view of a blade plug 300 with a plug tool 330 attached thereto in accordance with an exemplary embodiment of the disclosure is shown. Features of blade plug 300 may be substantially similar to features of blade plug 200 of FIG. 2, and thus like features are labeled with similar reference numerals except preceded by a "3" rather than a "2."

Blade plug 300 includes a first body 302 and a second body 304. A plug recess 306 if formed between an outer diameter of the first body 302 and an outer diameter of the second body 304. Retained between the first and second bodies 302, 304 and within the plug recess 306 is a retaining ring 307. The first body 302 and the second body 304 are held together by one or more fasteners (not shown) as described above. A plug boss 310 extends from the first body 302, e.g., upward in FIG. 3. An aperture 311 passes through the center of the plug boss 310. In some embodiments, and as shown in FIG. 3, the aperture 311 may be threaded in order to threadedly engage with a threaded portion of a plug cap 312. The plug cap 312 may include an engagement mechanism 314 therein, as described above. In alternative embodiments, aperture 311 may include a separate threaded insert. In some such embodiments, the threaded insert may be formed from the same or a different material from the rest of the first body 302.

The plug cap 312 includes a first portion 316 and a second portion 318. The first portion 316 may be a top or cap to the plug cap 312. The first portion may define an engagement surface 317 that is configured to engage with a top or exterior surface of the plug boss 310, as shown. Further, the first portion 316 of the plug cap 312 defines the engagement mechanism 314. The first portion 316 also includes a cap seal 320 on the engagement surface 317. Cap seal 320 is configured to sealing engage between the engagement surface 317 of the first portion 316 of the plug cap 312 and a top surface of the plug boss 310, as shown.

The second portion 318 of the plug cap 312 is configured to engage with the aperture 311 in the plug boss 310 of the first body 302. In some embodiments, such as when the aperture 311 is threaded or incorporates a threaded insert, the second portion 318 may be also threaded. Those of skill in the art will appreciate that other types of connections and engagements may be used without departing from the scope of the disclosure.

The second portion 318 of the plug cap 312 is configured to enable the plug cap 312 to move, actuate, slide, etc. between a first position and a second position. In the first position (shown in FIG. 3), the plug cap 312 is fully engaged with the plug boss 310. That is, the engagement surface 317, the cap seal 320, and the top surface of the plug boss 310 form a sealed engagement therebetween. Thus, the first position may be referred to as a closed position.

The plug cap 312 may then be operated such that it moves to a second position that is at least partially disengaged from the plug boss 310. For example, in some embodiments, the first position may be when the second portion is fully, threadedly engaged with threads of the aperture 311 of the plug boss 310 or the threaded insert within aperture 311. In the second position, the plug cap 312 may be moved upward in FIG. 3, such that the cap seal 320 no longer forms a complete seal between the engagement surface 317 of the plug cap 312 and the plug boss 310. That is, in some embodiments, the second position may be defined by partial or complete unthreading of the second portion 318 from the plug boss 310.

In the second position, fluid, such as air, may be able to flow between a first side 322 of the blade plug 300 to a second side 324 of the blade plug 300. For example, the first side 322 may be a blade cavity or blade interior and the second side 324 may be exterior to the blade cavity, see, for reference, FIG. 1. In the first position, fluid may not be able to pass from the first side 322 to the second side 324, or in the other direction, due to the plug cap 312 and the cap seal 320. However, when the plug cap 312 is in the second position, the cap seal 320 is not in contact with the engagement surface 317 of the plug boss 310, and thus air may be able to pass through the blade plug 300. To enable this, a passage 326 is configured to fluidly connect the first side 322 with the second side 324. In some embodiments, passage 326 may be a hole that passes through the first body 302. Thus, the second position may be referred to as an open position.

Also shown in FIG. 3 is a plug tool 330 configured to enable generation of a vacuum or near-vacuum in a blade cavity by extraction or evacuation of air through the blade plug 300. Alternatively, the plug tool 330 can be configured to increase pressure within a blade cavity by injecting fluid, such as gas, through the blade plug 300. Thus, the plug tool 330 is configured to control fluid communication to and from the blade cavity through the blade plug 300.

The plug tool 330 includes a tool body 332 and an operating portion 334. The tool body 332 defines a tool cavity 336 with portions of the tool body 332 configured to sealingly engage with an exterior surface of the plug boss 310 and/or with a surface of the first body 302. As shown, the seal between the tool body 332 and the plug boss 310 is formed, in part, by first tool seal 338 which sealingly fits between the tool body 332 and an exterior surface of the plug boss 310.

The tool body 332 also includes or defines a port 340 that fluidly connects the second side 324 and the tool cavity 336. When the first tool seal 338 is engaged with the plug boss 310, the port 340 provides the only fluid communication between the second side 324 and the tool cavity 336.

Extending into the tool cavity 336 is a portion of the operating portion 334. The operating portion 334 is configured to engage with the engagement mechanism 314 of the plug cap 312 and to move the plug cap 312 from the first position to the second position and from the second position to the first position. A second tool seal 342 provides a seal between the operating portion 334 and the tool body 332 such that fluids, such as air, cannot pass between the two parts (332, 334) of the plug tool.

Figure 4:
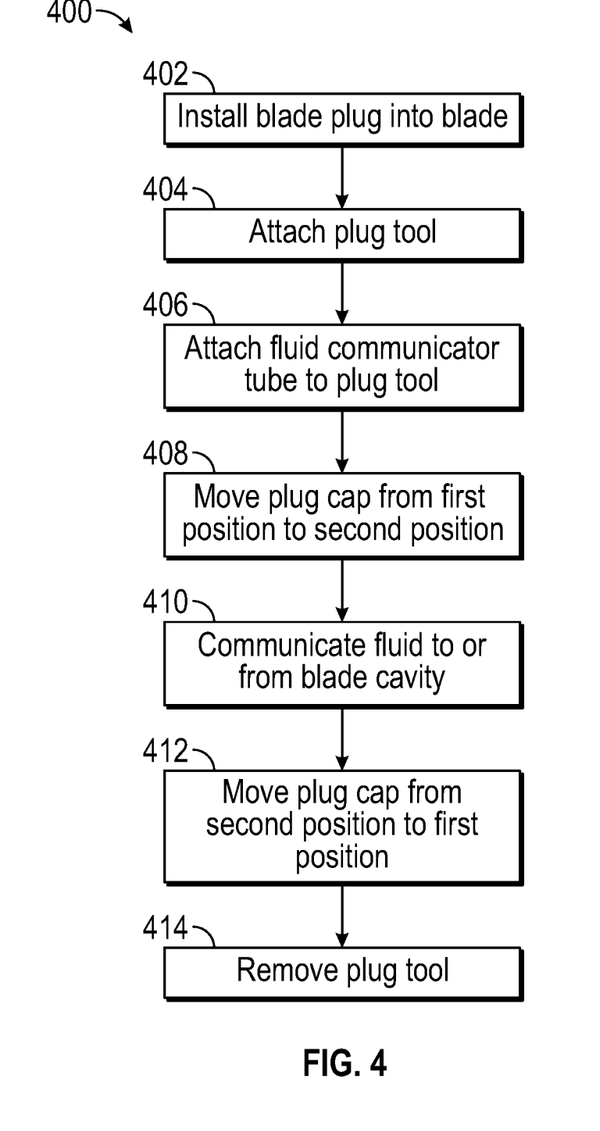
FIG. 4 is an operation for communicating fluid to or from a blade cavity in accordance with an exemplary embodiment of the disclosure.

Turning now to FIG. 4, an operation 400 for communicating fluid to or from the blade cavity, such as generating a vacuum within a blade cavity, is shown. At step 402, a blade plug is installed within an opening of a blade. When installed on the blade, ambient air is trapped within a cavity of the blade. To remove the air from the blade cavity, a plug tool is attached to the blade plug at step 404. A fluid communicator, such as a vacuum tube or pressure tube, may then be attached to a port of the plug tool at step 406. In some embodiments, as part of step 406, the fluid communicator may be operated to communicate fluid to or from a cavity of the plug tool, prior to moving to step 408. For example, at step 406, a vacuum may be formed in a cavity of the plug tool.

At step 408, the plug tool is used to move a plug cap from a first position to a second position. The fluid communicator is then used to communicate fluid to or from the cavity of the blade, such as pulling air to form a vacuum, through the plug tool, and out the port of the plug tool at step 410.

The air passes through a first body of the blade plug by means of a passage that passes therethrough, e.g., passage 326 in FIG. 3. The passage fluidly connects an interior side of the plug, i.e., the blade cavity, with an exterior side when a plug cap is in the second, or open, position. When the plug cap is in the first, or closed, position, there is no fluid communication through the passage between the first side and the second side.

Thus, at step 410, fluid may be communicated into or out of the blade cavity. For example, air may be removed from the cavity of the blade and creating or generating a vacuum or near vacuum within the blade. Alternatively, fluid, such as a gas, may be pumped or communicated into the cavity. After the fluid is communicated into or out of the blade cavity, the plug cap may be moved back to the first, or closed, position by operation of the plug tool at step 412. With the plug cap sealing the blade plug closed, the plug tool 330 may be removed, at step 414.

Although a specific order of steps has been described above and shown in FIG. 4, those of skill in the art will appreciate that the order provided is not the only way to achieve forming a vacuum or increasing pressure in a blade by use of a blade plug and plug tool as described herein. Thus, the operation 400 is provided merely for illustrative and explanatory purposes and the disclosure is not limited thereby. Further, as noted, although described with respect to forming a vacuum, those of skill in the art will appreciate that the process described herein may be used to inject fluid or increase pressure within a blade cavity.

In some embodiments the elements of the blade plug may be formed substantially of aluminum, steel, or other suitable materials. Aluminum may be used to provide adequate sealing while maintaining good durability, resistance, and low weight. In some embodiments, the first and second bodies may be formed of aluminum and the plug cap and fasteners configured to connect the first and second bodies may be formed from steel. Further, in some embodiments, the threaded portions of the first body may be formed from steel or formed by a steel insert to provide additional strength at the point of threading/unthreading operations.

Advantageously, embodiments disclosed herein provide for communication of fluid through a blade plug during manufacture of the blade. Thus, in accordance with some embodiments disclosed herein, a vacuum may be generated within a blade cavity of an aircraft blade. The vacuum within the cavity of the blade enables the reduction or removal of stresses that would otherwise be imposed on the blade during operation, particularly at altitude of an aircraft.

Further, advantageously, there is no additional imposition during manufacture of a blade for part of the assembly to be made or formed in a vacuum or near-vacuum environment. As such, relatively minor changes may be made to current manufacturing operations while taking advantage of embodiments of the disclosure, i.e., vacuum formation within a blade cavity.

While the disclosure has been described in detail in connection with only a limited number of embodiments, it should be readily understood that the disclosure is not limited to such disclosed embodiments. Rather, embodiments of the disclosure can be modified to incorporate any number of variations, alterations, substitutions, combination, sub-combination, or equivalent arrangements not heretofore described, but which are commensurate with the spirit and scope of the disclosure. Additionally, while various embodiments of the disclosure have been described, it is to be understood that aspects of the disclosure may include only some of the described embodiments.

For example, although described herein as a means of generating a vacuum or increasing pressure within a blade, the same process and tool(s) may be used to check air pressure within a blade cavity, as will be appreciated by those of skill in the art. Further, although some exemplary dimensions, materials, shapes, configurations, etc. are shown and described, those of skill in the art will appreciate that other dimensions, materials, shapes, configurations, etc. may be used without departing from the scope of the disclosure. Further, in some embodiments, the plug tool and blade plug may be formed as an integral piece. For example, with reference to FIG. 3, the first body 302 and the tool body 332 may be integrally formed.

Accordingly, the disclosure is not to be seen as limited by the foregoing description, but is only limited by the scope of the appended claims.

What is claimed is:

1. A method of manufacturing an aircraft blade comprising:
    attaching a fluid communicator to a plug tool connected to a blade plug:
        wherein the blade plug comprises a first body having a boss extending therefrom and an aperture passing through the boss, the first body configured to sealingly engage with an opening of an aircraft blade, a plug cap releasably engageable with the boss and moveable between a first position and a second position, a passage passing through the first body configured to allow fluid communication through the first body; and a second body configured to releasably attach to the first body and form a plug recess between at least a part of the first body and at least a part of the second body, wherein, when the plug cap is in the first position, fluid may not pass through the passage and, when the plug cap is in the second position, fluid may pass through the passage, and
        wherein the plug tool is removably attachable to the first body, the plug tool having (i) a tool body sealingly attachable to the boss of the first body and (ii) an operating portion engageable with the plug cap to control movement of the plug cap between the first position and the second position,
        wherein the tool body defines a tool cavity when attached to the first body and the plug tool includes a port for engagement with a tool to generate a vacuum within the tool cavity;
    opening the passage in the blade plug using the plug tool;
    communicating fluid to or from a blade cavity through the passage using the fluid communicator connected to the port;
    sealing the passage in the blade plug using the plug tool; and
    removing the plug tool after the sealing the passage in the blade plug.

2. The method of claim 1, further comprising installing the plug tool on the blade plug.

3. The method of claim 1, further comprising evacuating air from the tool cavity of the plug tool prior to operating the fluid communicator as a vacuum to evacuate air from within the aircraft blade.

4. The method of claim 1, wherein opening the passage in the blade plug comprises moving the plug cap from the first position to the second position.

5. The method of claim 4, wherein sealing the passage in the blade plug comprises moving the plug cap from the second position to the first position.

6. The method of claim 1, further comprising installing the blade plug in an opening of the aircraft blade.

7. The method of claim 1, further comprising checking a pressure within the blade cavity when the passage is open.

8. A blade plug assembly comprising:
a blade plug and a plug tool;
the blade plug comprising:
a first body having a boss extending therefrom and an aperture passing through the boss, the first body configured to sealingly engage with an opening of an aircraft blade;
a plug cap releasably engageable with the boss and moveable between a first position and a second position;
a passage passing through the first body configured to allow fluid communication through the first body; and
a second body configured to releasably attach to the first body and form a plug recess between at least a part of the first body and at least a part of the second body,
wherein, when the plug cap is in the first position, fluid may not pass through the passage and, when the plug cap is in the second position, fluid may pass through the passage; and
the plug tool removably attachable to the first body, the plug tool having (i) a tool body directly attachable to the boss of the first body and configured to create a seal about the boss, and (ii) an operating portion engageable with the plug cap and configured to control movement of the plug cap between the first position and the second position,
wherein the tool body defines a tool cavity when attached to the first body and the plug tool includes a port for engagement with a tool to generate a vacuum within the tool cavity.

9. The blade plug of claim 8, further comprising at least one fastener configured to releasably attach the second body to the first body.

10. The blade plug of claim 8, further comprising a retainer ring configured to engage with the plug recess and configured to provide sealing engagement between the blade plug and the aircraft blade.

\* \* \* \* \*